US006562889B2

(12) United States Patent
Rao

(10) Patent No.: US 6,562,889 B2
(45) Date of Patent: May 13, 2003

(54) DISPERSANT IN NON-POLAR SOLVENT

(75) Inventor: Prabhakara Satyauolu Rao, Maplewood, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/837,784

(22) Filed: Apr. 18, 2001

(65) Prior Publication Data

US 2003/0018111 A1 Jan. 23, 2003

(51) Int. Cl.$^7$ .................................................. C08K 5/06
(52) U.S. Cl. ........................................ 524/366; 524/319
(58) Field of Search ................................ 524/462, 366, 524/319

(56) References Cited

U.S. PATENT DOCUMENTS

| 4,094,911 | A |   | 6/1978 | Mitsch et al. |
| 4,523,039 | A |   | 6/1985 | Lagow et al. |
| 4,724,092 | A | * | 2/1988 | Fukui ............................ 252/54 |
| 4,894,484 | A |   | 1/1990 | Lagow et al. |
| 5,026,621 | A |   | 6/1991 | Tsubuko et al. |
| 5,210,274 | A |   | 5/1993 | Huth |
| 5,283,148 | A |   | 2/1994 | Rao |
| 5,397,669 | A |   | 3/1995 | Rao |
| 5,530,053 | A |   | 6/1996 | Rao et al. |
| 5,573,711 | A |   | 11/1996 | Hou et al. |
| 5,604,070 | A |   | 2/1997 | Rao et al. |
| 5,681,881 | A |   | 10/1997 | Jing et al. |
| 5,733,526 | A | * | 3/1998 | Trevino ...................... 424/9.52 |
| 5,753,763 | A |   | 5/1998 | Rao et al. |
| 5,861,175 | A | * | 1/1999 | Walters ....................... 424/486 |
| 5,919,293 | A |   | 7/1999 | Moffatt et al. |
| 5,919,866 | A |   | 7/1999 | Rao et al. |
| 5,959,050 | A |   | 9/1999 | Mosbach et al. |
| 6,197,426 | B1 |   | 3/2001 | Coppens |
| 6,313,335 | B1 | * | 11/2001 | Roberts ....................... 556/419 |

FOREIGN PATENT DOCUMENTS

| EP | 0 594 472 A | 4/1994 |
| EP | 0 683 436 A | 11/1995 |
| JP | 62-200335 | 4/1987 |
| WO | WO 96/31547 A | 10/1996 |
| WO | WO 97/35904 A | 10/1997 |
| WO | WO 99/67297 | 12/1999 |

* cited by examiner

*Primary Examiner*—Paul R. Michl
(74) *Attorney, Agent, or Firm*—Philip Y. Dahl

(57) ABSTRACT

The present invention provides a stable, non-film-forming dispersion comprising a) dispersed particles, b) a liquid non-polar solvent which is preferably fluorinated, and c) a dispersant selected from the group consisting of highly fluorinated polyethers, having an atomic ratio of carbon to oxygen of between 2 and 4 inclusive, and bearing at least one polar functional group which is preferably an ionizable group such as a carboxylic acid group.

22 Claims, No Drawings

DISPERSANT IN NON-POLAR SOLVENT

FIELD OF THE INVENTION

This invention relates to a stable, non-film-forming dispersion of particles in a liquid, non-polar solvent, preferably a fluorinated solvent, that includes a dispersant selected from the group consisting of highly fluorinated polyethers, having an atomic ratio of carbon to oxygen of between 2 and 4 inclusive, and bearing at least one polar functional group.

BACKGROUND OF THE INVENTION

U.S. Pat. No. 5,397,669 (Minnesota Mining & Manufacturing) discloses liquid toners for use with perfluorinated solvents. The patent discloses that the compositions are film-forming, allowing them to function properly as toners. ('669 at p. 8 Ins. 3–5). The '669 patent discloses pigment particles bound to a polymer that is highly fluorinated in specific parts, and that includes monomer units having groups that bind polyvalent metal ions. The '669 patent also discloses pigment particles bound to a polymer that is highly fluorinated in its entirety, without requiring monomers having groups that bind polyvalent metal ions.

U.S. Pat. No. 5,530,053 (Minnesota Mining & Manufacturing) also discloses liquid toners for use with perfluorinated solvents. The toners of '053 are polymeric dyes that are highly fluorinated in specified parts and have attached chromophoric groups. The '053 patent discloses that the toner can form a latex in perfluorinated solvent, where the toner takes a core-shell form with the hydrocarbon portion in the core and the fluorocarbon portion in the shell.

U.S. Pat. No. 5,919,293 (Hewlett-Packard) discloses ink jet inks composed of colorants in Fluorinert™ solvents (Minnesota Mining & Manufacturing Co., St. Paul, Minn.), which are perfluorinated or nearly-perfluorinated alkanes.

U.S. Pat. No. 5,573,711 (Copytele) discloses the use of certain polymeric fluorosurfactants in electrophoretic image displays. The '711 patent teaches the use of Fluorad™ surfactants (Minnesota Mining & Manufacturing Co., St. Paul, Minn.), including FC-171, having the structure $R_f$—$SO_2N(C_2H_5)(CH_3CH_3O)_nCH_3$, where n is about 8 and $R_f$ is a fluorocarbon portion.

U.S. Pat. No. 4,356,291 (Du Pont) discloses hexafluoropropylene oxide polymers terminating in a variety of end groups and methods of making same.

Co-assigned patent applications U.S. Ser. No. 09/604,894, 09/604,889 and 09/605,211 are currently pending. The disclosures of those applications are incorporated herein by reference.

SUMMARY OF THE INVENTION

Briefly, the present invention provides a stable, non-film-forming dispersion comprising a) dispersed particles, b) a liquid, non-polar solvent, and c) a dispersant selected from the group consisting of highly fluorinated polyethers, having an atomic ratio of carbon to oxygen of between 2 and 4 inclusive, and bearing at least one polar functional group which is preferably an ionizable group such as a carboxylic acid group.

What has not been described in the art, and is provided by the present invention, is the highly stable dispersion achieved by use of the dispersant according to the present invention which is particularly useful in an electrophoretic display device.

In this application:

"highly fluorinated", means containing fluorine in an amount of 40 wt % or more, but preferably 50 wt % or more and more preferably 60 wt % or more, and refers to the fluorine content of a population of chemical moieties where applicable, such as in the term, "one or more highly fluorinated macromers";

"non-fluorinated", means containing substantially no fluorine, i.e. containing fluorine in an amount of 5 wt % or less, but preferably 1 wt % or less and most preferably 0 wt %, and refers to the fluorine content of a population of chemical moieties where applicable, such as in the term, "one or more non-fluorinated free-radically-polymerizable monomers";

"ionizable functional group", means a functional group that may ionize in water, such as carboxyl groups, acidic sulfur-containing groups such as —$SO_3H$ and —$SO_2H$, acidic phosphorus-containing groups such as —$PO_3H_2$, and the like;

"hydrogen bonding functional group", means a functional group having a hydrogen atom available for hydrogen bonding, such as functional groups containing —OH, —NH or —SH moieties, including hydroxyl groups, amino groups, and the like;

"polar functional group", means an ionizable functional group or a hydrogen bonding functional group, preferably being an ionizable functional group and most preferably being carboxyl;

"C(number)" refers to a chemical moiety containing the indicated number of carbon atoms;

"(meth)acrylate" means acrylate and methacrylate; and

"substituted" means, for a chemical species, substituted by conventional substituents that do not interfere with the desired product or process, e.g., substituents can be alkyl, alkoxy, aryl, phenyl, halo (F, Cl, Br, I), cyano, etc.

It is an advantage of the present invention to provide a highly stable dispersion of pigment or dyed latex particles that is particularly useful in an electrophoretic display device.

DETAILED DESCRIPTION OF PREFERRED EMBODIMENTS

The present invention provides a stable, non-film-forming dispersion comprising a) dispersed particles, b) a liquid, non-polar solvent, and c) a dispersant selected from the group consisting of highly fluorinated polyethers, having an atomic ratio of carbon to oxygen of between 2 and 4 inclusive, and bearing at least one polar functional group which is preferably an ionizable group such as a carboxylic acid group.

The dispersed particles according to the present invention may be any suitable particles. Preferably the particles have an average diameter of 1000 nm or less, more preferably 350 nm or less, more preferably 300 nm or less, more preferably 250 nm or less, and most preferably 200 nm or less. Preferably the particles are organic. Preferably the particles are non-fluorinated. In one preferred embodiment, the dispersed particles are particles of pigment material. Preferably the pigment particles consist of pigment crystalite aggregates. These aggregates are preferably encapsulated, either partially or fully, by dispersant that is anchored or adsorbed to the particle surface. In another preferred embodiment, the dispersed particles are latex particles, more preferably (meth)acrylic latex particles. The latex particles may contain dyes that may be dispersed in the latex particles or covalently bound. The latex particles may be homogeneous or may have a core-shell structure. The latex particles are preferably encapsulated, either partially or fully, by dispersant that is anchored or adsorbed to the particle surface.

The solvent may be any suitable non-polar solvent that is liquid at room temperature. Preferably, the solvent is a hydrocarbon solvent, more preferably a fluorinated hydrocarbon solvent. More preferably, the solvent is a highly fluorinated solvent, especially a branched or unbranched, cyclic or non-cyclic fluoroalkane. Most preferably the solvent is perfluorinated. Preferred solvents include FLUORINERT™ fluorinated solvents available from 3M Company, St. Paul, Minn. Two especially preferred solvents are FLUORINERT FC-75, a perfluorinated $C_8$ solvent, CAS No. 86508-42-1, and FLUORINERT FC-84, a perfluorinated $C_7$ solvent, CAS No. 86508-42-1. The solvent preferably has a dielectric constant of 3.0 or less.

The density of particles in solvent (solids content) may be any level at which the dispersion is stable and does not significantly coagulate. For use of the dispersion in an electrophoretic display, the solids content may be any level that allows proper functioning over repeated cycles. Preferably, the solids content is less than 10 wt %, more preferably less than 5 wt %, and most preferably less than 2 wt %.

The dispersant is a highly fluorinated polyether having an atomic ratio of carbon to oxygen of between 2 and 4 inclusive, preferably about 3, and bearing at least one polar functional group. Preferably the dispersant is perfluorinated in its backbone. Preferred dispersants are described by Formula I:

n—C$_3$F$_7$O—(CF(CF$_3$)—CF$_2$O)$_n$—CF(CF$_3$)—COOH     (I)

Most preferably the dispersant is perfluorinated throughout. Preferred dispersants comprise poly(hexafluoropropylene oxide) polymers, poly(tetrafluoroethylene oxide) polymers and poly(octafluorobutylene oxide) polymers, and polymers containing various combinations of (hexafluoropropylene oxide), (tetrafluoroethylene oxide) and (octafluorobutylene oxide) units. Most preferably the dispersant comprises a poly(hexafluoropropylene oxide) polymer. The molecular weight of the dispersant is preferably in the range of 2,500–7,500.

The polar functional group may be either an ionizable functional group or a hydrogen bonding functional group, as defined above, but is preferably an ionizable functional group, more preferably an acidic group, and most preferably a carboxyl group. Preferably the polar functional group is a terminal or end group or the dispersant.

The dispersions according to the present invention may be incorporated into electrophoretic displays. A typical display comprises two planar electrodes defining a thin gap between them which holds the dispersion. When a sufficient voltage of the correct polarity is applied, the dispersed particles are drawn out of suspension and onto one electrode. That electrode, which is substantially transparent, forms the inner surface of a viewing glass, such that the particles form an image viewed through the glass. In contradiction to the characteristics of an electrostatic toner, which must form a permanent image under analogous conditions, the dispersed particles of the present invention must return to dispersion when the voltage is removed or reversed.

The dispersions according to the present invention have high resistance to film formation when used in electrophoretic display devices. To determine resistance to film formation, an actual device may be used or a breadboard device as described in the examples below. Dispersions of any solids content may be tested but preferably the solids content is 1 wt %. The device is preferably used in a normal manner, alternately applying and removing (or reversing) the typical use voltage. The voltage should be sufficient to remove particles from suspension and create an image when applied. Preferably the dispersions are non-film-forming to the extent that they redisperse completely (by appearance to the naked eye) after at least twenty cycles, more preferably after at least 100 cycles, and most preferably after at least 10,000 cycles.

The dispersion and/or the dispersed particles may also include charging agents. The charging agent renders the particle mobile under the influence of an electric field. In addition, the charge imparted to the particles by the charging agent creates an electrostatic repulsion between particles which improves resistance to film formation. The charging agent is preferably cationic, more preferably a quaternary ammonium cation. Preferred charging agents include 1-ethyl-3-methyl-1H-imidazolium bis(trifluoromethylsulfonylamide), which may be prepared as disclosed in the examples below; $(C_4H_9)_3N$:HOC(O)—$C_7F_{15}$; $(C_3H_7)_4N^+{}^-OC(O)$—$C_7F_{15}$; $(C_4H_9)_4N^+{}^-OC(O)$—$C_9F_{19}$; $C_7F_{15}$—$CO_2H$; and combinations thereof.

In electrophoretic display applications, dispersions according to the present invention preferably demonstrate a high conductance as measured by the method described in the examples below. Measured conductance is taken to reflect the charge/mass ratio (charge density) of the particles in suspension, whether imparted by the charging agent or inherent in the particle itself. Preferred dispersions according to the present invention have a conductance of 1 picomho/cm or more, more preferably 5 picomho/cm or more, more preferably 40 picomho/cm or more, and most preferably 80 picomho/cm or more.

Preferably the dispersion according to the present invention has a high conductance without the addition of a charging agent; preferably a conductance of 1 picomho/cm or more, more preferably 5 picomho/cm or more, more preferably 40 picomho/cm or more, and most preferably 80 picomho/cm or more.

This invention is useful in electrophoretic display devices.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all chemicals and reagents were obtained or may be available from Aldrich Chemical Co., Milwaukee, Wis.

The following pigments were used:

Raven 1200 Carbon Black (CAS Registry No: 1333-86-4; Columbian Chemicals Co; Atlanta, Ga.).

Degussa FW 18 Black (Degussa Corp., Ridgefield Park, N.J.).

Cyan PB 15:6 (Sun Chemical Corp., Cincinnati, Ohio).

Monastral™ Red 796D (CIBA Specialty Chem. Corp., High Point N.C.)

PY83 Yellow (Sun Chemical Corp., Cincinnati, Ohio).

SpectraPac C Blue 15:4 [249-3049] (Sun Chemical Corp., Cincinnati, Ohio).

Cyan Pigment Sunfast Blue 15:4 [249-2480] (Sun Chemical Corp., Cincinnati, Ohio).

Pigment Dispersion Examples 1–14

Except as noted following for Examples 8, 10, 13 and 14, in each of the Examples reported in Table I the indicated pigment was suspended in a mixture of the indicated weight of solvent, 3MT Fluorinert™ liquid FC-75 (specified molecular weight 480) (CAS No: 86508-42-1; 3M Co., St. Paul, Minn.) (hereinafter "FC-75") and the indicated weight (Coulter Corp., Miami, Fla.) with a measuring range of 3 nm to 3 μm. Particle sizes were obtained at the high dilution range set by the instrument. Reported particle sizes represent an average for the dispersion.

Conductance, reported in Table I, was measured using a Scientifica Model 627 conductivity meter (available from Scientifica of Princeton, N.J.) using a stainless steel concentric cylinder probe. The dispersions were diluted to 1% solids strength in FC-75 for measurement. A frequency of 18 Hz was applied to the outer cylinder. The conductivity of the liquid sample was determined by measuring the current between the outer cylinder and the inner cylinder.

TABLE I

| Example | Pigment | Charging Agent | Solvent (g) | Dispersant (g) | Particle Size (nm) | Conductance (picomho/cm) |
|---|---|---|---|---|---|---|
| 1 (59 K) | Raven 1200 Carbon Black, 3.0 g | yes | 200 g | 10 g Krytox ™ 157-FSL | 140 | 50 |
| 2 (59 K) | Raven 1200 Carbon Black, 3.0 g | no | 200 g | 12.5 g Krytox ™ 157-FSL | 125 | 89.2 |
| 3 (69 K) | Raven 1200 Carbon Black, 3.0 g | no | 200 g | 3 g Krytox ™ 157-FSH | 130 | 38.8 |
| 4 (84 K) | Raven 1200 Carbon Black, 3.0 g | no | 200 g | 5 g Krytox ™ 157-FSM | 130 | 50–60 |
| 5 (86 K) | Degussa FW18 Black, 3 g | no | 200 g | 10 g Krytox ™ 157-FSL | 610 | 36 |
| 6 (59 K) | Raven 1200 Carbon Black, 3.0 g | no | 200 g | 18 g Krytox ™ 157-FSL | 150 | 93.5 |
| 7 (60 C) | Cyan PB 15:6 Pigment, 3 g | yes | 200 g | 10 g Krytox ™ 157-FSL | 245 | 172 |
| 8 (64 C) | Cyan PB 15:6 Pigment, 3 g | yes | 200 g | 10 g Krytox ™ 157-FSL | 170 | 2.3 |
| 9 (61 M) | Monastral ™ Red 796D, 3 g | yes | 200 g | 10 g Krytox ™ 157-FSL | 220 | 55 |
| 10 (73 M) | Monastral ™ Red 796D, 3 g | no | 200 g | 3 g Krytox ™ 157-FSH | 250 | 48.5 |
| 11 (76 Y) | PY83 Yellow, 3 g | no | 200 g | 6 g Krytox ™ 157-FSH | 265 | 7 |
| 12 (67 Y) | PY83 Yellow, 3 g | yes | 200 g | 3 g Krytox ™ 157-FSL | 220 | 69.5 |
| 13 (117 C) | SpectraPac ™ C Blue 15:4 6 g + Raven 1200 Carbon Black, 0.5 g | no | 500 g | 18 g Krytox ™ 157-FSL | 163 | not measured |
| 14 (122 C) | Cyan Pigment Sunfast Blue 15:4 6 g + Raven 1200 Carbon Black, 0.2 g | no | 500 g | 18 g Krytox ™ 157-FSL | 173 | not measured | of dispersant, a carboxylic acid terminated poly (hexafluoropropylene oxide), Krytox® 157-FSL (specified molecular weight aprox. 2500), Krytox® 157-FSM (specified molecular weight 3500-4000), or Krytox® 157-FSH (specified molecular weight 7000–7500) (CAS Registry No: 860164-51-4, Du Pont Performance Lubricants, Deepwater, N.J. 08023). The suspension was transferred to an Igarashi ball mill containing as a grinding media roughly 250 g of 1 mm glass beads (Potter Industries Inc., Brownwood, Tex. 76801). The suspension was shear mixed at 3000 rpm for 1 hour and collected by draining through the exit mesh filter screen.

In Example 8 the solvent was a 10:3 mixture by weight of FC-75 and Oxsol 2000 (trifluoromethyltoluene, Occidental Petroleum Co., Dallas, Tex.), instead of FC-75 alone.

In Example 10, 13 and 14, 1000 g of yttrium treated zirconia beads (1.5mm; Sp. Gr.=6) (available from Glen Mills, Inc., Clifton, N.J.) were used as the grinding media instead of glass beads.

Where the addition of charging agent is indicated in Table I, 0.1 g of a 12% solution of zirconium TEN-CEM® (a $Zr^{4+}$ neodecanoate available from OM Group, formerly Mooney Chemical Co., Cleveland, Ohio) in mineral oil was added during grinding.

Particle sizes reported in Table I were measured using a Coulter N4 PLUS dynamic light scattering photometer The dispersion of Example 1 was tested in a breadboard display device, which included a transparent indium tin oxide electrode coated on an essentially planar high refractive index display glass opposite an essentially planar metal counter electrode. The gap between electrodes was 5–10 μm. The volume between the display glass electrode and the counter electrode was filled with the dispersion. In the "on" position, a test voltage was applied for less than a second, driving the dispersed particles to the display glass. In the "off" position, voltage was removed. No film formation was evident and the dispersion was stable after numerous on/off cycles.

Acrylic Latex Dispersion Examples 15–18

In Examples 15–18, acrylic latexes were made by dispersion polymerization using a dispersant according to the present invention. The latexes were synthesized using the components listed in Table II and the procedure described following.

A mixture of the indicated acrylic monomers, including 2.5 g PEG 400 diacrylate crosslinker as indicated (Polysciences Inc., Warrington Pa.), and 0.2 g Solvent Blue (C.I. 97) dye as indicated, was suspended in 200 g of Fluorinert™ solvent FC-75 along with a small quantity of Genesolve™ 2000 (essentially $CH_3CCl_2F$; Allied Signal, Morristown, N.J.) (to facilitate and accelerate the solvation of the dye) and 6 g of Krytox™ 157-FSH, as the dispersant, in a three-neck flask equipped with a reflux condenser, nitrogen inlet tube and addition funnel. Where indicated, methylstyrene is Aldrich Catalog #30,898-6; 3(4)-Methylstyrene; mixture of isomers [39294-88-7] (2000 Catalog). Where the addition of charging agent is indicated in Table II, 0.25 g of a 12% solution of Zirconium TEN-CEM® (a $Zr^{4+}$ neodecanoate available from OM Group, formerly Mooney Chemical Co., Cleveland, Ohio) in mineral oil was added. 1 g of a polymerization initiator, Trigonox™ 21C-50, was added to the reaction mixture. (Akzo Nobel Chemicals Inc., Watertown, Conn.). This reaction mixture was flushed with nitrogen for 30 minutes and then the mixture was polymerized for 20–24 hours at 75° C. A second 1 g increment of the initiator was added after 6–8 hours. The resulting latex was then filtered through a thickly folded cheesecloth to remove agglomerated particles.

TABLE II

|  | Ex. 15 (77C) | Ex. 16 (80) | Ex. 17 (78C) | Ex. 18 (81) |
|---|---|---|---|---|
| Dye | 0.2 g Solvent Blue (C.I. 97) | none | 0.2 g Solvent Blue (C.I. 97) | none |
| Monomers | 10 g methylstyrene; 2.5 g glycidyl methacrylate | 10 g methylstyrene; 2.5 g glycidyl methacrylate | 10 g isobornyl acrylate; 2.5 g glycidyl methacrylate | 10 g isobornyl acrylate; 2.5 g glycidyl methacrylate |
| Crosslinker: PEG (400) diacrylate | 2.5 g | 2.5 g | 2.5 g | 2.5 g |
| Charging agent | no | no | no | yes |
| Conductance (picomho/cm) | 3.8 | 0.3 | 2.09 | 4 |
| Particle Size | 350 nm | 250 nm | 275 nm | 190 nm |
| Solids Content (g/l) | 0.378 | not measured | 0.69 | 0.68 |

Particle size and conductance were measured as described above. Solids content was measured as grams of solids per liter of latex dispersion by evaporating a known volume of the latex to dryness by heating to 100° C. in a vacuum oven and weighing of the remaining dry solids.

These Examples demonstrate the utility of the dispersant of the present invention with latex dispersions.

Pigment Dispersions in Non-Fluorinated Solvents, Examples 19–21

In the following Examples, pigment particles were dispersed in non-fluorinated solvents including common acrylate monomers by use of dispersants according to the present invention.

TABLE III

| Ex. | Pigment | Solvent | Dispersant |
|---|---|---|---|
| 19 | Raven 1200 Carbon Black, 2 g | 200 g Isopar™ G | 10 g Krytox™ 157-FSL |
| 20 | Raven 1200 Carbon Black, 3 g | 150 g Isobornyl Acrylate | 5 g Krytox™ 157-FSL |
| 21 | Cyan PB 15:6 Pigment, 3 g | 40 g Isopar™ G, 160 g Isobornyl Acrylate | 10 g Krytox™ 157-FSL |

In Example 19, the indicated components were mixed by sonication with a Branson Sonifier/Cell Disruptor fitted with a cup ultrasonic horn (Model 350, Branson Ultrasonics Corp., Danbury, Conn.), to yield a dispersion with an average particle size of 500 nm. The resulting dispersion was moderately stable and gentle agitation was required to redisperse after a few hours standing.

In Example 20, the indicated components were mixed by shear mixing in a Hill Grinder (Hill Mixer, Inc., Paterson, N.J.) for 15 minutes at about 1000 rpm. A moderately stable dispersion was obtained. The loose flocks formed on standing for a few hours could be redispersed on gentle agitation.

In Example 21, the indicated components were mixed by shear mixing in a Hill Grinder (Hill Mixer, Inc., Paterson, N.J.) for 15 minutes at about 1000 rpm. The resulting dispersion was moderately stable and gentle agitation was required to redisperse after a few hours standing.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

I claim:

1. A stable, non-film-forming dispersion comprising a) dispersed particles, b) a liquid, non-polar solvent, and c) a dispersant selected from the group consisting of highly fluorinated polyethers, having an atomic ratio of carbon to oxygen of between 2 and 4 inclusive, and bearing at least one polar functional group.

2. The dispersion according to claim 1 wherein said solvent is a liquid, non-polar hydrocarbon solvent.

3. The dispersion according to claim 1 wherein said solvent is highly fluorinated.

4. The dispersion according to claim 1 wherein said solvent is perfluorinated.

5. The dispersion according to claim 1 wherein said dispersant is perfluorinated.

6. The dispersion according to claim 1 wherein said at least one polar functional group is an end group.

7. The dispersion according to claim 1 wherein said at least one polar functional group is an ionizable functional group.

8. The dispersion according to claim 1 wherein said at least one polar functional group is a carboxylic acid group.

9. The dispersion according to claim 1 wherein said solvent has a dielectric constant equal to or less than 3.0.

10. The dispersion according to claim 1 wherein said solvent comprises a perfluorinated alkane.

11. The dispersion according to claim 1 wherein said dispersed particles comprise acrylic polymer latex particles.

12. The dispersion according to claim 1 wherein said dispersed particles comprise pigment.

13. The dispersion according to claim 1 wherein said dispersed particles have an average particle size of 300 nm or less.

14. The dispersion according to claim 1 wherein said dispersed particles have an average particle size of 250 nm or less.

15. The dispersion according to claim 1 wherein said dispersed particles have an average particle size of 200 nm or less.

16. The dispersion according to claim 1 which contains no charging agent.

17. The dispersion according to claim 16 which has a conductance of 1 picomho/cm or more.

18. The dispersion according to claim 17 which has a conductance of 5 picomho/cm or more.

19. The dispersion according to claim 17 which has a conductance of 40 picomho/cm or more.

20. The dispersion according to claim 17 which has a conductance of 80 picomho/cm or more.

21. An electrophoretic device comprising the dispersion according to claim 1.

22. An electrophoretic display comprising the dispersion according to claim 1, wherein said dispersed particles may be alternately a) removed from dispersion by application of an electric field, and b) redispersed by removal or reversal of said electric field.

* * * * *

UNITED STATES PATENT AND TRADEMARK OFFICE
CERTIFICATE OF CORRECTION

PATENT NO.   : 6,562,889 B2  
DATED        : May 13, 2003  
INVENTOR(S)  : Rao, Prabhakara S.

It is certified that error appears in the above-identified patent and that said Letters Patent is hereby corrected as shown below:

Column 5,  
Line 14, "3MT" should read -- 3M$^{TM}$ --

Column 8,  
Line 62, "claim 17" should read -- claim 16 --  
Line 64, "claim 17" should read -- claim 16 --  
Line 66, "claim 17" should read -- claim 16 --

Signed and Sealed this

Twenty-first Day of October, 2003

JAMES E. ROGAN  
*Director of the United States Patent and Trademark Office*